(12) United States Patent
Baruchello

(10) Patent No.: US 7,775,101 B2
(45) Date of Patent: Aug. 17, 2010

(54) DYNAMIC GEAR INSPECTION SYSTEM

(75) Inventor: Roberto Baruchello, Oxford, MI (US)

(73) Assignee: Marposs Societa per Azioni, Bentivoglio (IT)

( * ) Notice: Subject to any disclaimer, the term of this patent is extended or adjusted under 35 U.S.C. 154(b) by 407 days.

(21) Appl. No.: 11/833,553

(22) Filed: Aug. 3, 2007

(65) Prior Publication Data

US 2008/0028847 A1  Feb. 7, 2008

Related U.S. Application Data

(60) Provisional application No. 60/835,475, filed on Aug. 3, 2006.

(51) Int. Cl.
G01M 13/02 (2006.01)
G01M 13/00 (2006.01)

(52) U.S. Cl. .................... 73/162; 73/865.8; 33/501.16; 33/549

(58) Field of Classification Search ............. 33/501.16, 33/501.19, 549, 551–554, 555.1; 73/162, 73/865.8–865.9
See application file for complete search history.

(56) References Cited

U.S. PATENT DOCUMENTS

| | | | | |
|---|---|---|---|---|
| 2,261,093 A | * | 10/1941 | Poupitch | 33/501.14 |
| RE22,953 E | * | 12/1947 | Praeg | 33/501.16 |
| 2,496,212 A | * | 1/1950 | Holt | 33/555.1 |
| 2,699,841 A | * | 1/1955 | Gunderson | 184/6.12 |
| 3,076,257 A | * | 2/1963 | Svenson | 29/888.025 |
| 3,086,294 A | * | 4/1963 | Motz | 33/501.19 |
| 3,181,247 A | * | 5/1965 | McMahan et al. | 33/501.19 |
| 4,186,626 A | * | 2/1980 | Chamberlain | 475/337 |
| 5,392,644 A | * | 2/1995 | Frazier | 73/162 |
| 5,629,627 A | * | 5/1997 | Hoshino et al. | 324/538 |

FOREIGN PATENT DOCUMENTS

JP            56160602 A  * 12/1981    ............. 33/501.16

* cited by examiner

*Primary Examiner*—Thomas P Noland
(74) *Attorney, Agent, or Firm*—Butzel Long

(57) ABSTRACT

A universal dynamic gear quality and consistency verification inspection system and method is provided. The system and method provides a dynamic gear verification inspection station including a Double Flank master gear and a probe for inspecting gear features and an electronic plug having pre-reference pads and mechanical rests for supporting and locating the part to be inspected. The probes are provided to verify all angles and functional parameters relayed to appropriate software for evaluation and record maintenance. A probe may also be provided for face checking.

19 Claims, 2 Drawing Sheets

DYNAMIC GEAR INSPECTION SYSTEM

TECHNICAL FIELD

The present invention relates generally to a system and method for inspecting mechanical articles. More particularly, the present invention relates to a system and method for dynamically inspecting gears to verify quality and consistency.

BACKGROUND OF THE INVENTION

It is necessary in almost every application of gears in various systems that the gears be of good quality and consistent configuration. It is not possible, nor is it necessarily desirable, for these gears be individually and manually inspected by workers. Rather, it is more desirable to provide an automated machine capable of making the appropriate inspection consistently and quickly.

The gear inspection must of necessity involve the verification of a variety of parameters. These parameters include the so-called "Double Flank" functional parameters (Fi", fi", Fr", Aa", Nick) that indicate a total radial composite deviation, and other parameters indicative of angular deviations, more specifically lead angle, lead angle variation, taper, and taper variation. As is known in the art, a dynamic inspection station for making all such verifications includes an expanding arbor or a post for supporting and measuring the gear to be checked, and two masters, i.e., a master roller gear on one side of the expanding arbor and a 'gimbal' master on the other side. The master roller gear meshes with the gear to be checked without backlash in a double flank arrangement, and is used to check the radial deviations, while the gimbal master has specially shaped teeth and allows the detection of angular deviations. Systems exist today which attempt to achieve a comprehensive system of quality and consistency verification.

However, having both master roller gears and gimbal masters, further to expanding arbors is costly, more specifically where different masters and arbor sizes are required to support the inspection of different gear manufacturing requirements. Additionally, the gimbal assembly must overcome inertia to follow the variation of the lead and taper angle of a gear, thus slowing down the inspection cycle.

Accordingly, a need exists today for an improved system and method for verifying quality and consistency of gears on a relatively high-speed basis.

SUMMARY OF THE INVENTION

Two preferred embodiments of a dynamic gear quality and consistency verification inspection station are provided. The system and method, regardless of the embodiment, provides a dynamic gear verification inspection station and method which overcomes the inadequacies and costs associated with prior art systems. The system of the present invention provides a dynamic gear verification inspection station that eliminates multiple parts and one master thereby eliminating excessive time and cost for inspections.

According to one embodiment of the disclosed invention, the dynamic gear inspection station includes only one master, more specifically a spring-loaded so-called "Double Flank" master gear. This station includes a probe for inspecting gear features and an electronic plug having pre-reference pads and mechanical rests for supporting and locating the part to be inspected. The probes are provided to verify all angles and functional parameters relayed to appropriate software for evaluation and record maintenance. One or more probes may also be provided for face checking.

According to another embodiment of the disclosed invention, the dynamic gear inspection station includes only one master, more specifically a Double Flank master gear. In this case, too, the station includes a probe for inspecting gear features, while the master gear is set within a master locating assembly, for example with a gimbal station, having probes for checking lead and taper angles. The part to be checked is located on an expanding arbor and drives the master gear. The expanding arbor station may also include a probe for face checking. Probes are provided to check all angles and functional parameters relayed to the appropriate software for evaluation and record maintenance. The expanding arbor and master locating assembly having probes provide a more accurate means to measure small parts, large and flat rings and parts with internal splines.

Other features of the invention will become apparent when viewed in light of the detailed description of the preferred embodiment when taken in conjunction with the attached drawings and the appended claims.

BRIEF DESCRIPTION OF THE DRAWINGS

For a more complete understanding of this invention, reference should now be made to the embodiment illustrated in greater detail in the accompanying drawings and described below by way of examples of the invention wherein.

DETAILED DESCRIPTION OF THE PREFERRED EMBODIMENT

Figure 1:
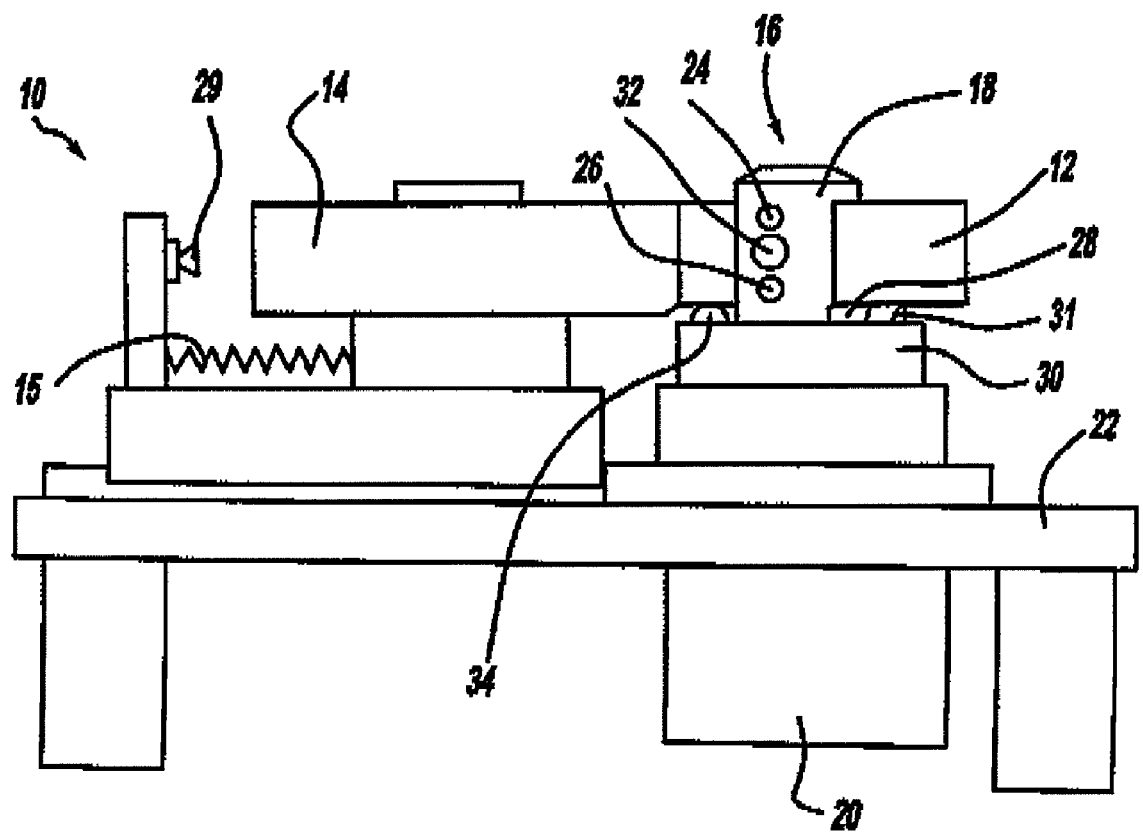
FIG. 1 illustrates a side elevational view of an embodiment of the inspection station for checking all angles and functional parameters of a gear according to the disclosed invention.

In the following figures, the same reference numerals will be used to refer to the same components. In the following description, various operating parameters and components are described for one constructed embodiment. These specific parameters and components are included as examples and are not meant to be limiting.

Referring to the drawings and in particular to FIG. 1, an embodiment of the disclosed invention is shown. Particularly, an elevated side view of an inspection station, generally illustrated as 10, is shown. The inspection station 10 has utility in verifying the parameters of a part 12 such as a gear defining a rotation axis. The part 12 includes an axial through opening and may be of a variety of materials, including both ferrous and non-ferrous metals as well as non-metal materials such as polymers or fibers.

The inspection station 10 includes a locating assembly, generally illustrated as 16, with a frame 22 rotatably and slidably supporting a spring-loaded roller master 14.

The locating assembly 16 includes a plug supporting structure 20, coupled to the frame 22, that includes a supporting ring 30 and carries a substantial vertical plug 18 with a substantially cylindrical central body defining a rotation axis of the plug.

Figure 2:
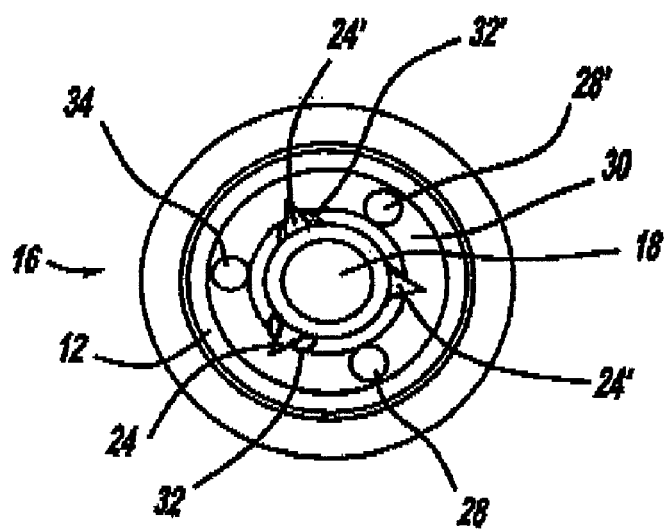
FIG. 2 illustrates a top view of the part locating assembly of the inspection station of FIG. 1, showing some details laying in lower planes.

As is also visible in FIG. 2, provided on the plug 18 are a plurality of contact points or probes which measure certain desired parameters of the part 12. The probes are part of a part-inspecting system and may be mechanical probes contacting the part to be checked, or non-contact (e.g. optical) probes. While a variety of positions and numbers of probes may be used, preferably there is an upper layer of probes 24, 24' and 24" and a lower layer of probes of which only one, probe 26, is visible in FIG. 1 (preferably three probes define the lower layer of probes). The probes 24, 24', 24" and 26 check at least one parameter of the part 12 when the roller master 14 engages the part 12. While a total of six probes in two layers are preferred, it is possible that a greater or lesser number of probes may be provided on a greater or lesser number of layers.

The locating assembly 16 further includes pre-reference surfaces, e.g. with pads 28, 28' positioned on the supporting ring 30. One or more optional probes, indicated with reference number 31 in FIG. 1, is/are provided on the supporting ring 30 for checking a lower face of the part 12. The pads 28, 28' are provided to allow a place whereupon a first location of said lower face of the part 12 leans before the roller master 14 engages the part 12.

The roller master 14 is loaded by a spring 15 and dictates the position, against the plug 18, of the part 12. Since the part ordinarily is a gear, the position is dictated by making reference to the gear teeth. To provide appropriate support for the part 12, the locating assembly 16 includes mechanical rests for seating the part 12. These mechanical rests can be of a variety of configurations, but it is preferred that they are one or more rollers or balls and most preferably include a couple of balls 32, 32' positioned in appropriate cavities defined in the exterior circumference of said central body of the plug 18 for providing lateral support to the part 12 and a ball 34 for providing lower support to the part 12. The ball 34 is provided in an appropriate cavity defined in the upper surface of the supporting ring 30.

A radial probe 29 detects movement of the spring-loaded roller master and provides a signal for Double Flank checks.

In use, an inner cylindrical surface of the part 12 at the axial through opening is pushed by the spring-loaded roller master 14 against the balls 32, 32'. The pads 28, 28' and the ball 34 are dimensioned and arranged in such a way that when the part 12 is free its lower face leans upon both the pads 28, 28' and the ball 34, while when the roller master 14 engages and pushes the part 12, the part 12 slightly tilts, and its lower surface detaches from the pads 28, 28' and is thereafter vertically supported solely by the ball 34. The balls 32, 32' and 34 do not affect the movement of the part 12 during rotation. The plug 18 detects the position of the axis of the part 12 during its rotation.

According to the described system, the probes of the above-mentioned two layers (24, 24', 24" and 26) allow to check the teeth of the part 12 as regards lead and taper angle, in absolute values and variations. The clearance between the plug 18 and the part 12 is large enough to accommodate a slight diametrical difference in parts such as the same part taken from different stages of the part-forming operation.

The data collected by the probes 24, 24', 24", and 26 are provided to a computer for comparative analysis against an ideal profile for a given part. If the actual data compares favorably with the ideal or model parameters, the part is deemed to have passed inspection. Non-compliance results in a rejected part.

The inspection station 10 eliminates the need for a gimbal station and a gimbal master, which optimizes costs and inspection time. The probes associated with the gimbal station are also eliminated by the present invention and are replaced by a more simple and compact plug. Further, the need for a costly expanding arbor is also eliminated by the present invention. Thus, the cycle time is shortened by eliminating the gimbal station, especially when measuring gears, where the lead and taper variation is difficult for a gimbal to follow.

It was mentioned above that a greater or lesser number of probes may be provided. Specifically, additional probes may be provided to measure face defects of the gear where, instead, along with the diameter, taper and bore shape are detectable without requiring any additional gauges.

As noted above, the couple of balls 32, 32' can be replaced by different mechanical rests, e.g. a single ball or at least one properly shaped surface allowing pivotal movements between the axes of the part 12 and the plug 18.

Pads 28, 28' can also be replaced by one or more different pre-reference surfaces having the same functional features described above.

Figure 3:
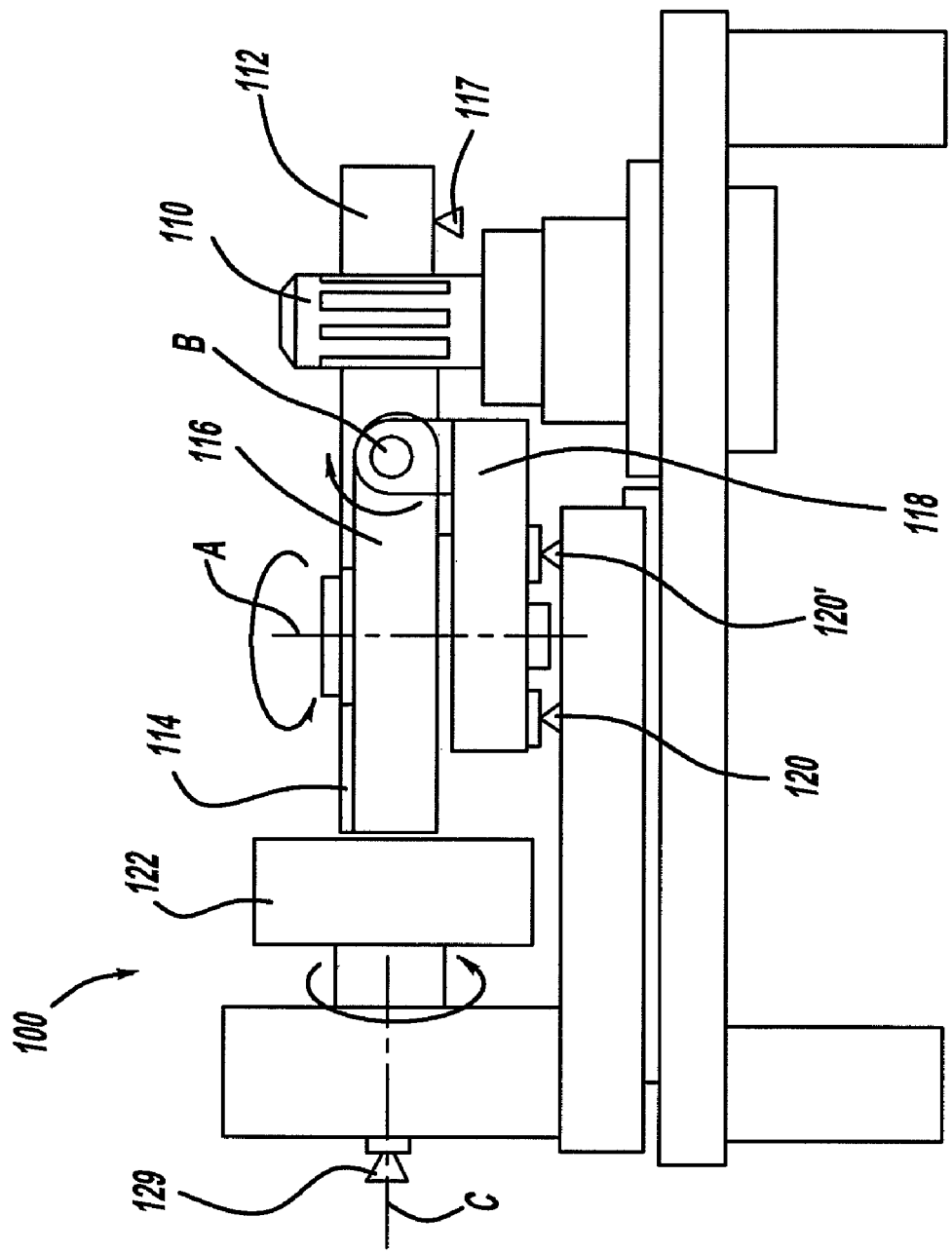
FIG. 3 illustrates a side elevational view of an alternate embodiment of the inspection station for checking all angles and functional parameters of a gear according to the disclosed invention.

FIG. 3 illustrates a side elevational view of an alternate variation of the dynamic gear inspection system of the present invention. According to this view, an inspection station, generally illustrated as 100, is provided. The inspection station 100 includes an expanding arbor or drive 110 for locating a part 112, such as a gear, to be checked. A Double Flank roller master 114 located within a master locating assembly with a gimbal station 116 is driven by the expanding arbor 110. The Double Flank roller master 114 is rotatable along a first axis A. The part 112 is located parallel to the roller master 114. A probe 117 is provided for checking the face of the part 112 to detect misplacement of the face of the part with respect to its inner diameter.

The gimbal station 116 includes a pivotable assembly 118, for measuring lead and taper angles of the part 112, which is pivotably attached to the gimbal station 116 along a second axis B. One or more probes for checking lead and taper angles of the part 112 is provided in operative association with the pivotable assembly 118. Preferably three such probes are provided, of which two probes, 120, 120', are illustrated. The probes 117, 120 and 120' are of the type illustrated in FIGS. 1 and 2 and discussed above with respect thereto. In general, the probes 117, 120 and 120' function to measure all angular parameters of the part 112. In conjunction with these probes, the expanding arbor 110 in combination with the gimbal station 116 provides accurate measurement of small parts, large and flat rings, and parts with internal splines, including double flank checking and interior diameters.

The inspection station 100 may accurately measure parts 112 that are too small to fit on the plug 18 of the inspection station 10 shown in FIGS. 1 and 2 and described in conjunction therewith. The gimbal station 116 is used with the roller master 114 for measuring Double Flank features. A rotatable slide 122, holding the gimbal station 116, is provided. A radial probe 129 detects movement of the rotatable slide 122 along a C axis. This provides a signal for Double Flank checks. This arrangement eliminates the need for a specially shaped gimbal master.

The data collected by the probes 117, 120 and 120' are provided to a computer for comparative analysis against an ideal profile for a given part. If the actual data compares favorably with the ideal or model parameters, the part is deemed to have passed inspection. Non-compliance results in a rejected part.

As a variation to the invention disclosed with reference to FIG. 3, the roller master 114 can be located on the expanding arbor 110, while the part to be checked 112 is located in the master locating assembly with the gimbal station 116. Moreover, one or the other of roller master 114 and part 112 may be put into rotation by proper means and drive the other.

The inspection system according to both the described embodiments and possibly featuring other variations advantageously allow to perform a complete inspection of a gear with only one master, and does not need any specially shaped gear master. The inspection station according to the embodiment of FIGS. 1 and 2 has the additional advantage of a very simple structure, with neither a gimbal station nor an expanding arbor.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A station for inspecting the exterior configuration of a substantially circular part, the part having an axial through opening, the station comprising:
    a frame;
    a roller master rotatably supported by said frame: and
    a locating assembly adapted to said frame, the substantially circular part being positionable on said locating assembly substantially parallel to said roller master, said locating assembly including a plug which substantially passes through the axial opening of the part when the part is positioned on said locating assembly, said plug further including at least one part-supporting mechanical rest.

2. The station for inspecting the exterior configuration of a substantially circular part of claim 1 further including at least one part-inspecting probe provided in said plug.

3. The station for inspecting the exterior configuration of a substantially circular part of claim 2 wherein said at least one part-inspecting probe fitted to said plug is selected from the group consisting of a contact and non-contact probes.

4. The station for inspecting the exterior configuration of a substantially circular part of claim 3 further including a probe operatively associated with said supporting ring.

5. The station for inspecting the exterior configuration of a substantially circular part of claim 1, the plug and the circular part to be inspected define rotation axes, wherein said at least one part-supporting mechanical rest includes at least one surface allowing pivotal movements between the rotation axes of the part and of said plug.

6. The station for inspecting the exterior configuration of a substantially circular part of claim 1 wherein said at least one part-supporting mechanical rest includes at least a ball fitted to said plug.

7. The station for inspecting the exterior configuration of a substantially circular part of claim 1 wherein said at least one part-supporting mechanical rest includes a couple of balls fitted to said plug.

8. The station for inspecting the exterior configuration of a substantially circular part of claim 1, wherein said roller master is spring loaded.

9. The station for inspecting the exterior configuration of a substantially circular part of claim 1 wherein said locating assembly further includes a supporting ring to which said plug is attached, said supporting ring having an upper surface, said supporting ring having said at least one part-supporting mechanical rest positioned thereon.

10. The station for inspecting the exterior configuration of a substantially circular part of claim 1 wherein said locating assembly further includes at least one pre-reference surface providing temporary support to the part.

11. The station for inspecting the exterior configuration of a substantially circular part of claim 1 wherein said locating assembly further includes a supporting ring to which said plug is attached, said supporting ring having an upper surface, said supporting ring having said at least one pre-reference pad positioned thereon.

12. A station for inspecting the exterior configuration of a substantially circular part having a series of gear teeth formed thereon, the station comprising:
    a frame;
    a roller master for operative association with the part to be inspected, said roller master being attached to said frame;
    a part-inspecting system operatively associated with said frame, said part-inspecting system including a probe for inspecting the lead and taper angles of the gear teeth of the part;
    a plug attached to said frame, the part to be inspected being positionable on said plug; and
    part supporting mechanical rests formed in association with said plug and being operatively associated therewith,
    wherein said roller master engages the gear teeth of the part and properly locates the part.

13. The station for inspecting the exterior configuration of a substantially circular part of claim 12 wherein said probe is fitted to said plug.

14. The station for inspecting the exterior configuration of a substantially circular part of claim 13, wherein said roller master is spring loaded.

15. The station for inspecting the exterior configuration of a substantially circular part of claim 12, the plug and the circular part to be inspected define rotation axes, wherein said part-supporting mechanical rests include at least one surface allowing pivotal movements between the rotation axes of the part and of the plug.

16. The station for inspecting the exterior configuration of a substantially circular part of claim 12 wherein said part supporting mechanical rests include a ball.

17. The station for inspecting the exterior configuration of a substantially circular part of claim 16 wherein said part supporting mechanical rests include a plurality of balls fitted to said plug.

18. The station for inspecting the exterior configuration of a substantially circular part of claim 12 further including a supporting ring to which said plug is attached, said supporting ring being mounted on said frame, said supporting ring having an upper surface, said supporting ring having a part-supporting mechanical rest positioned thereon for cooperating with a lower face of the part.

19. The station for inspecting the exterior configuration of a substantially circular part of claim 18 further including a probe operatively associated with said supporting ring.

* * * * *